(Model.)

A. A. PIERCE.
WHIFFLETREE.

No. 246,413. Patented Aug. 30, 1881.

Witnesses.
F. L. Ourand
H. C. Nintemann

Inventor
Andrew A. Pierce
by John J. Halsted
his Atty.

UNITED STATES PATENT OFFICE.

ANDREW A. PIERCE, OF ANDERSON, INDIANA, ASSIGNOR OF ONE-HALF TO JASPER N. WARD, OF SAME PLACE.

WHIFFLETREE.

SPECIFICATION forming part of Letters Patent No. 246,413, dated August 30, 1881.

Application filed July 6, 1881. (Model.)

*To all whom it may concern:*

Be it known that I, ANDREW A. PIERCE, of Anderson, in the county of Madison and State of Indiana, have invented certain new and useful Improvements in Whiffletrees for Buggies and Wagons, and in means for hitching the tugs or traces to the trees; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to equalize the draft for both horses of a double team; and also to equalize it for each shoulder of each horse; and also to afford a new and simple means for holding the tugs or traces upon the ends of the whiffletrees, the whole construction being at the same time simple and economical, and effecting a considerable saving in timber, ironing, and cost, as compared with any other whiffletrees known to me.

My invention for equalizing draft relates to that class in which one long tree and one short one are used, and in which the traces for each horse are fastened respectively one to the end of the long tree and one to the corresponding end of the short tree.

Hitherto in this class there has been a failure to secure an equalizing-draft because of a disregard of the proper relative lengths of the two trees for producing the best results, and, also, because of their relative positions, which usually requires that one trace should be longer than the other for each horse, these defects causing unequal pull or draft in case one horse is farther to the rear than the other, even when the team is moving straightforward on a smooth road; but on curves or bad roads these bad effects are much aggravated, and the strength of the animals is much wasted and they are needlessly fretted.

Figure 1:
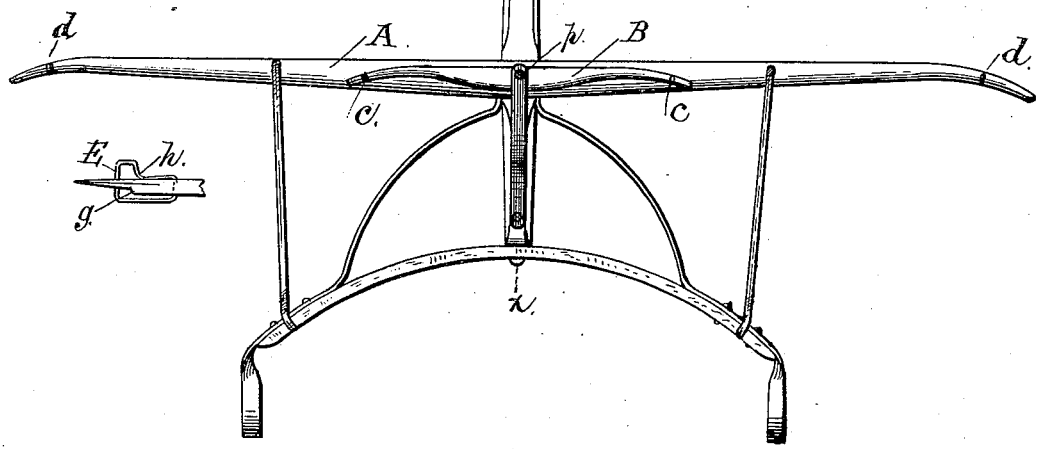
Figure 2:
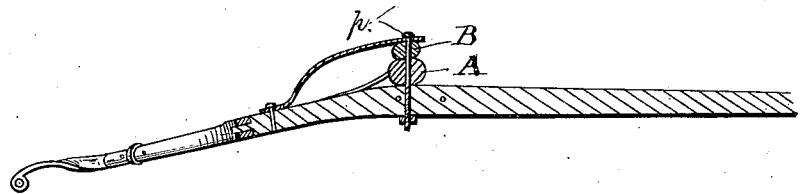
Figure 3:
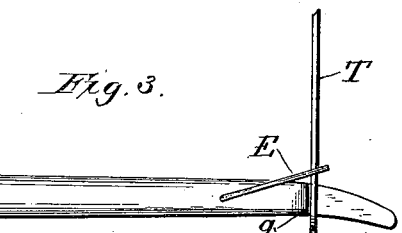
Figure 4:
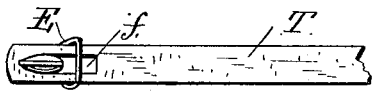
Figure 5:
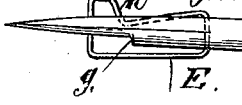

In the drawings, Figure 1 is a plan view, and Fig. 2 a cross-section through the line *x x* of Fig. 1, of a whiffletree made in accordance with my invention; Fig. 3, an under-side view of an end of one of the trees with its loop and trace; and Figs. 4 and 5 are end views and edge views, respectively, of the same, to show the hitching devices.

A is the long tree, which should be six feet, and not less, in length; and B the shorter one, and the length of B is to be eighteen inches long, or exactly one-fourth of the length of A; or, to speak more accurately, the distance between the points *c c* at which the traces are to be connected to B is eighteen inches, or exactly one-fourth the distance between the points *d d*, at which the other traces are connected to A, it being found by practical test and experience that this is the true proportion for securing the equalization of draft when conjoined with the proper position of B upon A and the arrangement of the points *c c* and *d d* all in the same straight line or vertical plane, so that when the traces are hitched the places at which they are hitched may be in one and the same straight line or vertical plane. The tree B is centered on the top of tree A, and not (as has heretofore been attempted) either at its front or rear, so as not only to give it free and full room for the widest needful range of motion, but also to bring the hitching-points *c c d d*, as heretofore stated, into one line. Both trees are shown as centered upon the same bolt or pin *p*. The larger tree may curve at its ends, if desired, in order to bring its hitching-points in line with those of the smaller tree.

For buggies and light wagons this special construction saves about one-half of the cost and about one-quarter of the timber required, as compared with the styles now in common use. If applied to road-wagons or farm-wagons it saves about one-quarter of the timber and about one-third of the cost, and in the case of heavy wagons it saves about two-fifths of the amount of iron-work needed and a like amount of labor in construction in each case.

The drawings show the trees independent of the shafts, (not necessary to be illustrated.)

The device will apply to any and all gearing where more than one horse is used.

As wagons are now usually constructed, the long tree should be six feet in length, in order to give the proper space between the outside traces, and if made longer than this its ends would project too far outside of the wheels; and the short tree must be eighteen inches long to give it the correct length to take up the slack of the inside traces, and at the same time to pull on a leverage. If made shorter than eighteen inches the tendency is to be pulled by the traces in a direction lengthwise of the tree, instead of on a leverage. If made longer than eighteen inches there would not be left enough space between the end of the short tree and the corresponding end of the long one to allow the traces full room for play without being crowded.

My novel device for holding the traces to the ends of the trees is as follows: Near each end of each tree is a swiveling metal holding-loop, E, through which the trace T is passed, the end of the trace being then by means of its slit or eye $f$ hooked onto the end of the tree. Any pull upon the trace brings the loop E close down near the tree, and all possibility of the trace becoming loose from the tree is positively avoided. Any appropriate shoulder, $g$, on the tree prevents the trace shifting its position, and a bend, $h$, in the loop serves the same duty, and both may be employed together, one being on one side of the tree and the other at its other side; or the tree may have a similar shoulder at each of its sides, but it is stronger with one only. This shoulder $g$ and bent part $h$ also afford space for receiving the full breadth of the trace freely, without crowding or cramping it. This construction, while extremely simple, is correspondingly secure and cheap, and there is no removable device or fastening pin or key needed, and therefore nothing liable to drop out or get mislaid, broken, or lost, and as the loop is made of just sufficient length to hold the trace to its place when pulled straight, there is practically no strain on the loop tending to disarrange or dislodge it.

I do not claim, broadly, the combination of one long and one short whiffletree, as these have been used before; but

I claim—

1. The described double whiffletree, composed of the long tree A and of the short one B, when the latter is not only made eighteen inches long or one-fourth the length of A, but is also centered on the top of A, and with the points $c\ c$ and $d\ d$, at which the traces are attachable, all placed in the same line or vertical plane, as and for the purposes set forth.

2. The swinging loop made with the bend $h$ at one of its sides, as shown and described, and applied to the whiffletree, made with a rabbet or shoulder at the opposite side, the two conjointly holding and acting upon the trace, as set forth.

ANDREW A. PIERCE.

Witnesses:
 DANIEL H. PATTERSON,
 HARRY DOWNHAM.